United States Patent [19]

Hegarty

[11] Patent Number: 4,826,670
[45] Date of Patent: May 2, 1989

[54] OXYGEN ENRICHED CLAUS SYSTEM WITH SULFURIC ACID INJECTION

[75] Inventor: William P. Hegarty, Allentown, Pa.

[73] Assignee: Air Products and Chemicals, Inc., Allentown, Pa.

[21] Appl. No.: 714,146

[22] Filed: Mar. 20, 1985

[51] Int. Cl.$^4$ .............................................. C01B 17/04
[52] U.S. Cl. ................................ 423/574 R; 423/540; 431/4; 431/5
[58] Field of Search ............... 423/574 R, 574 G, 576, 423/532, 540, 542, 543; 422/160; 236/12.1, 12.14; 110/190; 431/4, 5

[56] References Cited

U.S. PATENT DOCUMENTS

| | | | |
|---|---|---|---|
| 2,123,224 | 7/1938 | Buehr et al. | 423/573 G |
| 3,284,158 | 11/1966 | Johswich | 423/574 G |
| 3,366,455 | 1/1968 | Childers et al. | 423/574 G |
| 3,681,024 | 8/1972 | Hujsak et al. | 423/574 G |
| 3,822,341 | 7/1974 | Smith | 423/574 |
| 4,010,246 | 3/1977 | Steinrötter et al. | 423/542 |
| 4,011,822 | 3/1977 | Choi | 110/28 R |
| 4,153,674 | 5/1979 | Verloop et al. | 423/573 R |
| 4,212,817 | 7/1980 | Schmid et al. | 423/659 |
| 4,212,855 | 7/1980 | Kerner et al. | 423/522 |
| 4,279,882 | 7/1981 | Beavon | 423/574 R |
| 4,479,926 | 10/1984 | Behrmann et al. | 423/574 R |

FOREIGN PATENT DOCUMENTS 712907 8/1954 United Kingdom ................ 423/542

OTHER PUBLICATIONS

"Fundamentals of Sulfur Recovered by the Claus Process", by G. Gene Goar, 1977 Gas Conditioning Conference Report.
"Oxygen Use in Claus Sulfur Plants" by M. R. Gray and W. Y. Svrek, 1981 Gas Conditioning Conference Report.
"Claus Plant Oxygen Enrichment", 1983 publication by Linde of Union Carbide.
"Why Recover Sulfur from $H_2S$?" by H. Grekel, J. W. Palm, and J. W. Kilmer, Oil and Gas Journal, Oct. 28, 1968, p. 88+.
"Sulfur from Hydrogen Sulfide" by B. W. Gamson and R. H. Elkins, Chemical Engineering Progress, vol. 49, No. 4, p. 203 (1953).

Primary Examiner—John Doll
Assistant Examiner—Jeffrey Edwin Russel
Attorney, Agent, or Firm—Geoffrey L. Chase; James C. Simmons; William F. Marsh

[57] ABSTRACT

A process and system are set forth for improving an oxygen-enriched Claus process by introducing a sulfuric acid stream into the reaction furnace to moderate oxygen-induced high temperatures which allow oxygen-enrichment and attendant throughput in the Claus process to higher levels than heretobefore practiced.

11 Claims, 1 Drawing Sheet

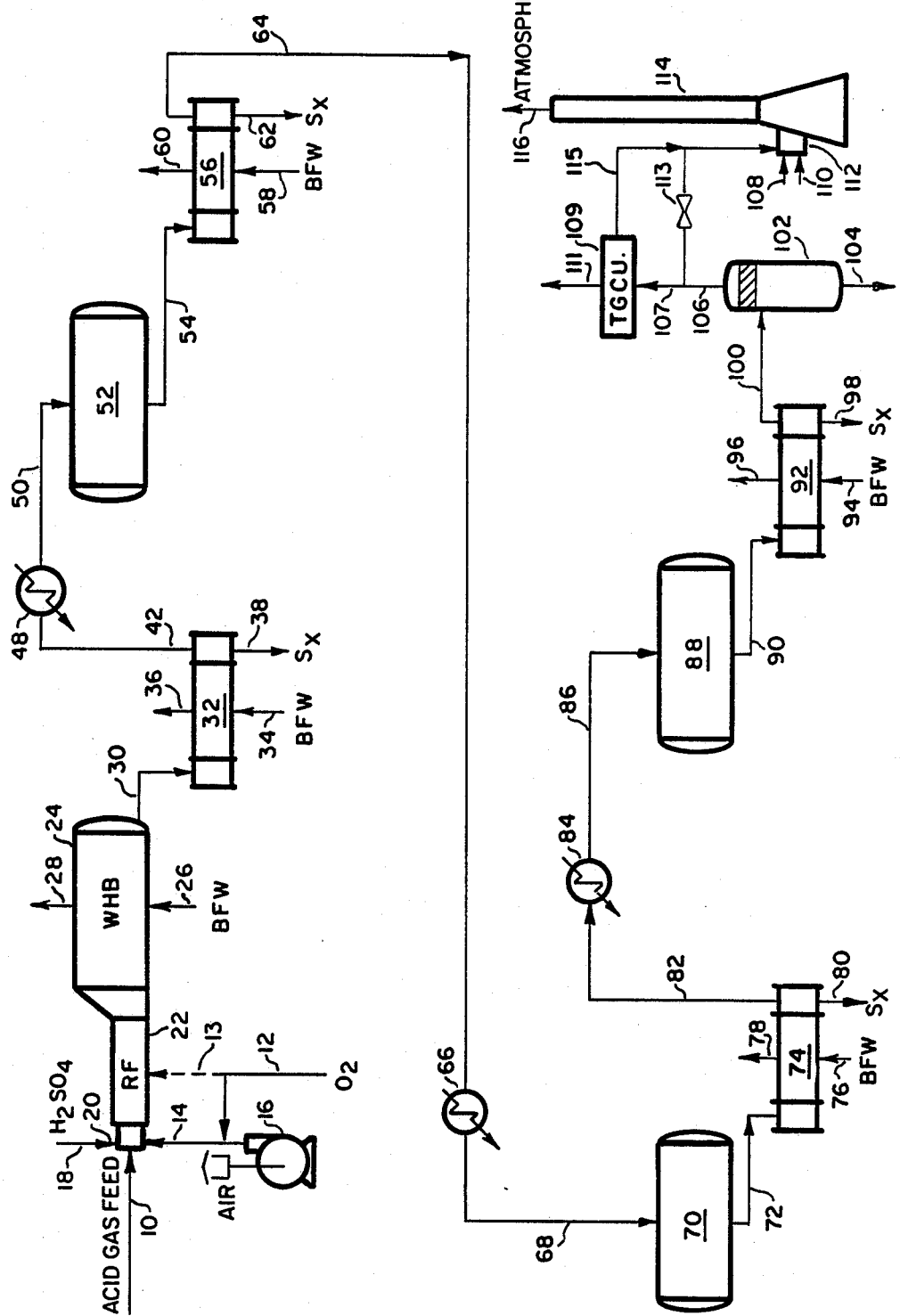

OXYGEN ENRICHED CLAUS SYSTEM WITH SULFURIC ACID INJECTION

TECHNICAL FIELD

The present invention is directed to the recovery of sulfur from hydrogen sulfide-containing gas streams. More specifically, the present invention is directed to an improved method of temperature moderation in a Claus sulfur plant using oxygen-enrichment to increase its capacity, wherein the temperature moderation is achieved by the introduction of sulfuric acid into the Clause reaction zone.

BACKGROUND OF THE PRIOR ART

The recovery of elemental sulfur from hydrogen sulfide-containing gas streams is known in the prior art as disclosed in the article "Fundamentals of Sulfur Recovered by the Clause Process" by B. Gene Goar, published in the 1977 Gas Conditioning Conference Report.

Oxygen-enrichment in the operation of a Claus sulfur plant to increase the capacity of hydrogen sulfide treated in such a plant has also been disclosed in the article "Oxygen Use in Claus Sulfur Plants" by M. R. Gray and W. Y. Svrcek, published in the 1981 Gas Conditioning Conference Report. It was disclosed more specifically that oxygen can be added to the air feed to the burner of a reaction furnace in a Claus sulfur plant to increase the amount of hydrogen sulfide which is combusted to sulfur dioxide for later catalytic conversion to elemental liquid sulfur product. The maximum capacity increase which can be achieved with oxygen enrichment is determined by the pressure drop through the plant, the reactor space velocity and temperatures of the reaction furnace in the various catalytic zones, particularly the refractory materials used in the furnace of the Claus plant.

In the 1983 publication by Linde of Union Carbide entitled "Claus Plant Oxygen Enrichment", it is noted that oxygen-enrichment limitations exist for rich hydrogen sulfide streams due to temperature limits in the furnace or waste heat boiler of the Claus plant. Oxygen enrichment is expressed as percent oxygen in the oxygen enriched oxidant gas (air). For example if 58 moles of oxygen are mixed with 100 moles of air containing 21 moles of oxygen, the resultant mixture is 158 moles of 50% oxygen enriched air (oxidant gas). This definition of oxygen enrichment still applies if the air and enriching oxygen are not premixed but are instead mixed in the flame or combustion chamber. Oxidant gas is used to contemplate any air and added oxygen fed to the Claus reaction furnace.

U.S. Pat. No. 3,822,341 discloses a Claus plant which uses oxygen-enrichment. One source of the oxygen is initially used to strip residual $SO_2$ from a sidestream in vessel 92, before the oxygen stream in line 96 is optionally recycled with the oxygen in line 12 going to the combustion zone of the waste heat boiler 8, as recited at col. 5, lines 65–68 of the specification. Because the oxygen content of such a stream is completely consumed in the exothermic reaction, this stream cannot be utilized as a moderating medium for flame temperature of the reaction furnace. As described by the Goar article above, Claus sulfur plants typically have an adiabatic reaction furnace followed by a waste heat boiler. The excessive temperature problem with oxygen enriched operation occurs in the adiabatic reaction furnace. U.S. Pat. No. 3,822,341 ignores the existence of this problem and does not suggest any solution.

U.S. Pat. No. 4,153,674 discloses a Claus plant and tail gas clean up plant wherein a gas stream in line 20 is removed from a tail gas system and is returned or recycled to the front end of the Claus plant 7. This patent does not consider oxygen-enrichment or flame temperature moderation by a recycle stream. Also, a tail gas is reacted to convert all sulfur to hydrogen sulfide, which is absorbed, stripped and returned to the Claus plant.

U.S. Pat. No. 4,212,817 discloses that a liquid diluent (water) may be added to a highly exothermic reaction such as the methanization of carbon oxides via the reversible reactions

to moderate reactor temperatures. The patent teaches that a reaction product additive, water in this case, is desirable so that an equilibrium shift to the left occurs and decreases the extent of the exothermic reaction and the resultant heat release.

U.S. Pat. No. 4,212,855 shows a process for sulfuric acid production wherein a portion of the effluent from the combustion furnace 2 is cooled by direct contact with water and the cooled effluent gases are returned as a temperature moderant to the furnace 2.

U.S. Pat. No. 4,279,882 discloses a sulfur recovery process which uses only a series of catalytic reaction beds rather than a combustion reaction furnace, as in the traditional Claus plant. A temperature modifying recycle stream is set forth in the patent, wherein stream 26 is returned to the feed in order to control the temperature in the catalytic reaction zones. This process is economical only for dilute hydrogen sulfide feed gas applications. It also requires a recycle blower operating at high temperature.

The present invention overcomes the shortcomings of the prior art by increasing throughput of a Claus plant with oxygen-enrichment to an extent beyond that considered feasible in the prior art because of flame temperature limitations. In addition, the present invention provides better throughput of reaction components through the Claus plant reaction train by reducing the carryover of inerts through the system. This is achieved by injecting sulfuric acid into the reaction furnace of the Claus plant. The combination of oxygen enriched oxidant gas and sulfuric acid injection decreases pressure drop in the downstream portion of the Claus plant over an air-only Claus plant operation. The highly endothermic decomposition of the injected sulfuric acid moderates the reaction furnace temperature at high oxygen enrichment levels. Additionally, because the sulfuric acid decomposition produces sulfur dioxide and oxygen, the requirement of expensive oxygen is decreased.

BRIEF SUMMARY OF THE INVENTION

The present invention is directed to a process for recoverying sulfur from a feed gas stream having a substantial hydrogen sulfide content, wherein the gas stream is partially combusted with an oxygen-enriched oxidant gas in a Claus reaction furnace, the combustion effluent is cooled with the attendant condensation and separation of sulfur in a first condensation zone and the remaining effluent stream is typically passed through at least one stage of reheating, conversion in a catalytic Claus reaction zone and cooling with attendant condensation and separation of sulfur in an additional condensation, wherein the improvement comprises introducing sulfuric acid into the reaction furnace zone to moderate the temperature of the reaction furnace zone and provide a portion of the oxygen for combustion.

Typically, the process uses three stages of reheating, conversion and cooling and separation subsequent to the first condensation zone.

The process is relevant for substantial feed gas hydrogen sulfide contents of 60 or greater mole percent, preferably rich hydrogen sulfide contents of 90 or greater mole percent.

Preferably the oxygen enrichment of the oxidant gas (oxygen gas and any air) to the reaction furnace is in the range of 32 to 100 mol%. More preferably, the enrichment is 40–75 mole%. The sulfuric acid injection can be in the range of 0.15 to 2.0 lbs. of 100% sulfuric acid per lb. of added 100% oxygen fed to the burner of the reaction furnace excluding the oxygen available from any air feed. Preferably the sulfuric acid injection is approximately 1 lb. of 100% $H_2SO_4$ per lb. of added 100% oxygen excluding oxygen from any air.

Preferably the temperature of the reaction furnace zone is maintained in the range of 2100° to 2800° F.

Preferably, the sulfuric acid has a concentration in aqueous solution of at least 50%, optionally 90% sulfuric acid is used. Alternately, 100% sulfuric acid can be used.

The invention also is directed to apparatus for recovering sulfur from a feed gas stream having a substantial hydrogen sulfide content by the Claus reaction, including: a reaction furnace for partially combusting a feed gas stream with an oxygen enriched oxidant gas, typically a first condensing means for cooling and condensing sulfur from the combustion effluent, at least one train comprising a reheating means, a catalytic Claus reactor and an additional condensing means for rewarming, further reacting and recovering sulfur by condensation from said effluent, wherein the improvement comprises means for introducing sulfuric acid into the reaction furnace of the Claus plant apparatus to reduce the temperature of said reaction furnace.

Preferably, the means for introducing sulfuric acid into the reaction furnace comprises a conduit and an orifice which disperses the sulfuric acid in liquid form into the burner or flame of the reaction furnace. Preferably the sulfuric acid is provided from a sulfuric acid alkylation process and comprises spent alkylation acid.

BRIEF DESCRIPTION OF THE DRAWING

The drawing is a schematic representation of the oxygen-enrichment and sulfuric acid injection embodiment of a Claus plant using the present invention.

DETAILED DESCRIPTION OF THE INVENTION

Claus sulfur recovery systems are widely utilized to recover sulfur from acid gas streams produced in natural gas purification and in petroleum refineries, primarily from amine sweetening. In refineries, the hydrogen sulfide is in crude oil and is contained in hydrocarbon desulfurization unit off gases and fluidized catalytic cracker unit off gases. The hydrogen sulfide is typically removed from the refinery and natural gas streams by amine sweetening units. Often times, gas streams produced in the amine unit are quite rich in hydrogen sulfide, particularly in petroleum refineries, where it may be in the range of 80 to 90 mole% hydrogen sulfice or greater. In many refineries, the Claus plant units are either fully loaded or subject to becoming fully loaded (capacity limited) due to the processing of heavier crude oils, which contain increasingly larger amounts of sulfur compounds. With the dwindling known reserves of refinable sweet hydrocarbons and crude oils, less attractive known sour oil reserves are now being processed which typically have higher sulfur content. This trend toward refining of such higher sulfur containing hydrocarbon feeds will increase in the future and will create capacity limitations on Claus plants presently in existence. Therefore, a method for increasing the capacity of the Claus plant to process hydrogen sulfide to elemental sulfur, while maintaining the temperature limitations of the materials of the Claus plant, is needed.

As Claus sulfur recovery unit feed rates are increased above capacity, several problems develop. At increased flow, the pressure drop through the Claus plant and tailgas clean-up unit increases and the back pressure increases require hydrogen sulfide and air feed at pressures beyond what is available from the equipment that supplies the hydrogen sulfide feed and the air blower that provides feed air. The increased flow also increases the space velocity in the reaction furnace and the catalytic reactor stages. This increase in space velocity reduces sulfur conversion and increases emissions to the tailgas clean-up unit. The increased flow to the tailgas clean-up unit increases its pressure drop and further lowers the tailgas sulfur recovery resulting in increased and usually environmentally unacceptable sulfur emissions. The increased back pressures in some Claus plants pose the risk of blowing liquid sulfur drain seals which would release noxious toxic hydrogen sulfide. Although high pressure sulfur drain seals and increased throughput equipment could be designed to meet the capacity requirements, the reduced sulfur conversion and increased sulfur emissions remain a problem in present day Claus plant operation.

One method which may be used to increased the capacity of an existing Claus plant is the use of oxygen to enrich the airstream (oxidant gas) to the reaction furnace of the Claus plant from 21 mole% oxygen, which is the content of air, up to 70–90 mole% oxygen or higher, such as 100 mole% oxygen (wherein no air is introduced into the Claus plant). Any increase in oxygen content of the airstream effectively reduces the nitrogen content of gases passing through the Claus plant and increases its throughput capacity for sulfur production by diminishing the gas flow of inerts, namely nitrogen which must also be passed throug the flow train of the Claus plant. Typically, the capacity of the Claus plant which is handling a 80–90 mole% hydrogen sulfide stream with a typical concentration of hydrocarbons can be increased 10–15% by enriching the air with oxygen. Any further addition of oxygen will cause the flame temperature limitations of the firebrick and refractory in the reaction furnace to be exceeded. Hydrogen sulfide streams having only substantial levels of 60% $H_2S$ or greater can also be processed.

If the acid gas stream is at about 150° F., contains 90 mole% hydrogen sulfide (rich), feed air is fed at a typical feed air blower temperature of 250° F., the Claus plant is performing a typical burn of only one third of the hydrogen sulfide (one third of the fully stoichiometric air requirements) and the burner is receiving air (21 mole% oxygen), then the theoretical adiabatic flame temperature should be about 2400° F. and the reaction furnace outlet temperature is about 2300° F. Note that as described in the Goar article, the theoretical flame temperature is typically higher than the reaction furnace outlet temperature, because, as subsequently described, the endothermic Claus reaction proceeds in the reaction furnace and cools the flame products. Note also that in refinery applications, the acid gas typically contains some ammonia. The ammonia content necessitates that the acid gas be kept above ambient temperature to avoid ammonium salt formation and plugging problems. The ammonia also combusts and increases the reaction furnace temperature substantially. If the airstream is enriched with oxygen to 40 mole% oxygen, the calculated adiabatic theoretical flame temperature should increase to about 3000° F. Again, if the airstream is enriched with oxygen, this time to 70 mole% total oxygen to the furnace as combustion gas, the calculated theoretical adiabatic flame temperature should increase to about 3350° F. Note however, that the extent to which hydrogen and carbon monoxide are formed in the reaction furnace and recombined on cooling can have a substantial effect on the oxygen requirement and reaction furnace temperature.

However, most better quality firebrick and refractory material installed in Claus plant reaction furnaces are good for a maximum continuous operating temperature of only 2700°–2800° F., if they have an alumina content of 85–90 wt% or greater. In practice, it is prudent to maintain temperatures below the extreme limits to avoid refractory failure. Therefore it may be seen from the above calculations that only limited oxygen enrichment (added oxygen), 30 to 32 mole% total oxygen content of the airstream can be used and still hold temperatures below a maximum of 2800° F. With the small reduction of nitrogen input when increasing the airstream oxygen content from 21 up to 32 mole% oxygen, only a modest increase in Claus plant capacity is realized, approximately 12–15%.

Oxygen enrichment can be increased with a suitable moderator or diluent, but the oxygen costs constitute a significant cost for operation or retrofit of a Claus plant to oxygen enriched operation. Sulfuric acid decomposes byt he following equation at the high temperatures of Claus reaction operation.

$$H_2SO_4 \rightarrow H_2O + SO_2 + 1/2 O_2 \qquad (I)$$

Therefore, sulfuric acid injection provides additional oxygen to the process and thereby reduces the amount of externally added oxygen that is required in oxygen enrichment because it provides some of the sulfur dioxide required and some of the oxygen required. To the extent sulfuric acid from the spent acid of a sulfuric acid alkylation plant is utilized, the by-product oxygen decomposition material is a low cost oxygen supplement which lowers the added oxygen cost and makes the overall process more attractive.

The present invention, however, permits increasing the oxygen enrichment to above 32 mole% total oxygen to increase capacity of an existing Claus sulfur recovery unit or a new sulfur recovery unit by injecting sulfuric acid into the reaction furnace to moderate the oxygen-enriched flame temperature. In practice, the injection rate of sulfuric acid would be set to provide dilution and cooling to control the reaction furnace temperature in the 2100°–2800° F. range. Preferably, the sulfuric acid is added independently into the burner of the reaction furnace. With this technique, hydrogen sulfide feed and sulfur recovery capacity can be increased by roughly 100% by enriching the airstream to 70 mole% total oxygen concentration in the oxidant gas when handling 90 mole% hydrogen sulfide acid gas feed. By injecting a sulfuric acid stream under atomized or well dispersed conditions, the flame temperature associated with very high oxygen-enrichment which is necessary to effect significant throughput increases is moderated by the relatively cool injected sulfuric acid and the endothermic decomposition reaction (I) set forth above. The sulfuric acid injection provides a moderating effect because the decomposition is very endothermic, and the acid can provide a heat sink by its sensible heat. Additionally to the extent it produces sulfur dioxide and oxygen and reduces externally added oxygen requirement and the attendent exothermic reaction, it decreases the exotherm to be moderated. In this disclosure, percent oxygen enrichment shall means the total oxygen from any air and added oxygen. Added oxygen shall mean externally supplied oxygen gas of any purity unless specified and excluding oxygen from the decomposition of sulfuric acid. Oxidant gas shall mean added oxygen and any air including nitrogen despite the fact that it is not an oxidant.

Although sulfuric acid from the sulfuric acid alkylation plant commonly associated with refineries and Claus plants is the most desired source of a moderator for the reaction furnace, other forms and sources of sulfuric acid could work or be utilized in a similar manner. Alternatively, sulfuric acid could be introduced from outside the associated refinery processes and supplied to the reaction furnace and injected as the moderator or diluent. Although the addition of sulfuric acid is preferred to be conducted into the burner or into the burner flame through its own independent orifice, it is also contemplated that sulfuric acid could be added to the acid gas feed stream prior to introduction to the burner of the reaction furnace. It is also possible to add the sulfuric acid to the oxidant gas stream introduced into the burner, such as the air, oxygen or oxygen enriched oxidant gas stream, but preignition of the resultant flammable mixture would have to be considered when hydrocarbon contaminated spent alkylation acid or sludge acid is used.

The combination of oxygen-enrichment and sulfuric acid injection provides an unexpected potential enhancement of capacity or throughput for a Claus plant. Particularly, the sulfuric acid provides an attractive alternative to other diluent components added to a reaction furnace in an oxygen-enrichment mode, because the sulfuric acid decomposes to provide $SO_2$ reactant to complete the Claus reaction and $O_2$ to provide at least some of the oxygen requirement for the Claus combustion. However, in addressing oxygen enrichment and oxidant gas, only air and added oxygen gas are considered. For instance, at the high temperature in the Claus SRU reaction furnace, ranging from 2000° to 2800° F., $H_2SO_4$ decomposes endothermically via the reaction

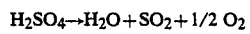

$$H_2SO_4 \rightarrow H_2O + SO_2 + 1/2\ O_2 \qquad (I)$$

With liquid $H_2SO_4$ charged at 80° F. and decomposed at 2600° F., the endotherm is 180,000 Btu/lb. moles of $H_2SO_4$. The strong endotherm provides cooling to offset the loss of $N_2$ heat capacity that accompanies reduction of $N_2$ feed as air is replaced by $O_2$. There are additional effects. As noted by Goar, the predominant Claus reaction furnace reactions are:

$$H_2S + 3/2\, O_2 \rightarrow H_2O + SO_2 \qquad (II)$$

$$2H_2S + SO_2 \rightarrow 2H_2O + 3/2\, S_2 \qquad (III)$$

The first reaction is very exothermic and goes to completion with the $O_2$ completely consumed. To the extent that $H_2SO_4$ decomposition provides $SO_2$, it decreases the reaction II requirement and the exotherm to be moderated. Note that decomposition also provides some of the $O_2$ required and decreases the required feed of expensive $O_2$. The use of a sulfuric acid injection configuration combined with oxygen enrichment can be provided as a retrofit to a capacity limited existing Claus plant system or it could be provided in a smaller size new installation taking into account the increased capacity freedom provided by the oxygen-enrichment and sulfuric acid injection.

Although it may appear that the addition of sulfuric acid to the reaction furnace would further aggravate capacity limitations in the Claus plant, in actuality, the avoidance of large quantities of nitrogen as a diluent by the removal of fractional or the entire quantity of air to the reaction furnace achieves significant capacity freedom both in the reaction furnace and the downstream catalytic converter.

Because of the decrease of nitrogen inerts, the conversion under catalytic conditions is decidedly higher than would be with other Claus processes. This is true because at the operating temperature of the catalytic converters the sulfur formed polymerizes and there is a substantial decrease in moles of gas in the reaction. Consistant with Le Chatelier's principle: the equilibrium conversion for a decreased volume reaction should increase with reaction pressure. Effective reaction pressure at constant total pressure is increased because of the decrease in the inerts partial pressure compared to air operation or water injection. Therefore, the overall conversion is found to decrease only slightly, while temperatures are moderated and capacity limitations are freed up. Also, decreased nitrogen flow results in sharply decreased tailgas flow, which will result in increased recovery in the tailgas cleanup unit.

Table 1 below compares several different modes of Claus plant operation wherein a 92% hydrogen sulfide rich stream is processed through a reaction furnace. All the cases are based on the same Claus plant and the same acid gas feed composition and rate as listed in Table 2 below. All cases assume thermodynamic equilibrium for the effluent gas, which is closely approached in actual plant operation. All cases are based on an oxygen feed adjusted to give an effluent gas $H_2S/SO_2$ mole ratio of 2 as is required to achieve maximum conversion to sulfur in the catalytic conversion stages downstream of the reaction furnace. Note that equilibrium quantities of carbon monoxide and hydrogen from decomposition of carbon dioxide and hydrogen sulfide are listed because their formation has a significant effect on the furnace temperature and oxygen requirement. The cases presented include an air base case, case 1, case 2 using 100% oxygen without temperature moderation and cases 3a, 3b and 3c using 100% oxygen with sulfuric acid injection varied to give a range of acceptable moderated temperatures to show the interaction of oxygen and sulfuric acid requirements with temperature.

To provide an indication of the effect of oxygen enrichment on pressure drop at constant hydrogen sulfide feed rate, relative pressure drop is listed in Table 1. To a first approximation, pressure drop through the reaction furnace and downstream sections of the Claus plant are proportioned to $V^2\rho$ where V is the volumetric flow rate of the reaction furnace and $\rho$ is the gas density. Also listed is the relative capacity at constant pressure drop which provides a measure of how much flow can be increased in the oxygen enrichment cases to increase capacity up to the original air based operation pressure drop limitation.

Study of the cases shows that when 100% oxygen is used without temperature moderation, case 2, the reduced flows decrease pressure drop to 29% of the air base case 1. This would permit increasing flows and capacities by 86% before the limiting pressure drop is re-established. Unfortunately, the furnace temperature is unacceptably high at 2891° F. But study of case 3 shows that injection of sulfuric acid to reduce the temperature to an acceptable 2700° F. with simultaneous oxygen adjustment to maintain the desired $H_2S/SO_2=2$ effluent, requires only 0.083 moles of sulfuric acid/oxygen and oxygen requirement is reduced 4% compared to case 2. The pressure drop reduction and potential capacity increase are the same as for case 2. Cases 3b and 3c show that additional sulfuric acid injection producing further reductions of temperature and of oxygen requirements of 13% and 16%, respectively, compared favorably to case 2, with relative pressure drops and potential capacity increases unchanged. While the cases presented consider only air and 100% oxygen, it should be appreciated that the illustrated effects and the invention are applicable to all levels of oxygen enrichment from above 21 (air) to 100% (oxygen only). Note also that depending on reaction furnace waste heat boiler arrangements and residence time, there may be some reaction and reequilibration on cooling that reduces the hydrogen content and increases hydrogen sulfide and raises the $H_2S/SO_2$ ratio. The extent to which this occurs is subject to debate among Claus technology experts. When it does occur, oxygen requirement and attendent reaction furnace temperature will increase. This will increase the sulfuric acid injection required to hole the desired temperature.

TABLE 1

| Case | 1 Air Base Case (Air) | 2 No Temperature Moderation (100% $O_2$) | 3a $H_2SO_4$ Inj. 100% $O_2$ | 3b $H_2SO_4$ Inj. 100% $O_2$ | 3c $H_2SO_4$ Inj. 100% $O_2$ |
|---|---|---|---|---|---|
| CLAUS SPENT ACID INJECTION ($H_2SO_4$) Reaction Furnace | | | | | |
| Furnace Temperature, °F. | 2186 | 2891 | 2700 | 2300 | 2186 |
| Net Sulfur Converted, % | 71.3 | 77.5 | 75.5 | 71.1 | 69.7 |
| Net Sulfur Converted, #/hr | 8469 | 9400 | 9431 | 9390 | 9339 |
| $S_{(L)}$ mole/hr | 263.8 | 292.8 | 294.2 | 292.5 | 290.9 |
| $H_2$ Produced, # mole/hr | 39.4 | 97.5 | 76.5 | 40.5 | 31.9 |
| CO Produced, # mole/hr | 4.15 | 11.0 | 9.0 | 4.6 | 3.5 |
| Oxygen Required, # mole/hr | 172.7 | 140.6 | 135.1 | 121.9 | 117.5 |

TABLE 1-continued

| | CLAUS SPENT ACID INJECTION (H$_2$SO$_4$) Reaction Furnace | | | | |
|---|---|---|---|---|---|
| Case | 1 Air Base Case (Air) | 2 No Temperature Moderation (100% O$_2$) | 3a H$_2$SO$_4$ Inj. 100% O$_2$ | 3b H$_2$SO$_4$ Inj. 100% O$_2$ | 3c H$_2$SO$_4$ Inj. 100% O$_2$ |
| H$_2$SO$_4$ Required, # mole/hr | — | — | 11.16 | 33.63 | 39.54 |
| Diluent/O$_2$ | | | | | |
| (mole ratio) | 3.76 | 0.0 | 0.083 | 0.28 | 0.33 |
| (lb. ratio) | 3.41 | — | 0.253 | 0.845 | 1.028 |
| O$_2$/H$_2$S Feed (mole ratio) | 0.457 | 0.372 | 0.357 | 0.322 | 0.311 |
| Total Flow In, # mole/hr | 1264 | 1236 | 556 | 565 | 567 |
| Effluent Gas, | | | | | |
| ACFM | 24,401 | 14,380 | 13,903 | 12,739 | 12,357 |
| LB/MIN. | 628 | 306 | 321 | 351 | 358 |
| Relative Pressure Drop | 1.0 | 0.29 | 0.29 | 0.29 | 0.29 |
| Relative Capacity at Constant Pressure Drop | 1.0 | 1.86 | 1.86 | 1.86 | 1.86 |

NOTE:
1 Hydrogen formation to equilibrium dictated by furnace outlet conditions.
2 No preheating of feed. Feeds at 100° F., 25.7 psia.
3 Claus furnace pressure 24.6 psia.
4 92% H$_2$S Feed; 378.4 moles/hr H$_2$S.

The present invention will now be described in greater detail with reference to the preferred embodiment which is illustrated in the Figure. An acid gas feed stream is introduced into the Claus system in line 10 having a composition as set forth in Table 2.

TABLE 2

| FEED STREAM CHARACTERISTICS | |
|---|---|
| Pressure, psia | 25.7 |
| Temperature, °F. | 100 |
| Flow Rate, # mol/hr | 409.5 |
| Composition, % | |
| H$_2$O | 3.25 |
| N$_2$ | 0.40 |
| CO$_2$ | 3.60 |
| H$_2$S | 92.40 |
| CH$_4$ | 0.10 |
| C$_2$H$_6$ | 0.10 |
| C$_3$H$_8$ | 0.15 |
| Air Composition, % | |
| O$_2$ | 21 |
| N$_2$ | 79 |

The feed is at a temperature of 100° F. and a pressure of 25 psia. The acid gas stream is introduced into the burner 20 of the reaction furnace 22 to be combusted with, potentially, air in line 14 supplied from compressor 16, as well as oxygen in line 12, also introduced into the burner for the downstream combustion reaction (referred to as oxidant gas). The oxygen can be mixed with the air or introduced separately into the combustion zone. The oxygen can be of any desired purity, although preferably commercially pure oxygen is introduced into the system. It is understood that depending upon the total oxygen content required, some or all the air introduced into the burner 20 will be deleted. Alternately, oxygen can be introduced separately either in the burner nozzle 20 or in the furnace 22 in line 13. In order to moderate the temperature of the oxygen-enriched combustion of the acid gas feed, sulfuric acid is introduced in line 18 directly into the burner 20. However, it is contemplated that the sulfuric acid addition could be made into the acid gas feed stream, or if temperature and flammability considerations from contained hydrocarbons were adequately controlled, into the oxidant gas stream of either air and/or oxygen.

The amount of sulfuric acid added, is in the range of 0.15 to 2.0 lb. per lb. of added 100% oxygen (excluding oxygen from air) fed to the system. Preferably, the sulfuric acid addition is approximately 1.0 lb. of sulfuric acid per lb. of added 100% oxygen (excluding oxygen from any air).

The sulfuric acid will generally have a concentration in aqueous solution of at least 50 weight %, preferably 90 weight %, and optimally 100 weight %. When spent acid sludge from sulfuric acid alkylation is used, the acid generally has a concentration of 90 weight % with 6 weight percent water and 4 weight % hydrocarbons. Hydrocarbon contamination of the sulfuric acid moderant should be maintained as low as possible because its combustion provides an exothermic result, consumes oxygen, decreases the net endothermic temperature moderation and coke formation could possible result. Up to 8 weight % hydrocarbon contamination can be tolerated, preferably 4 weight % or less.

The reactants are combusted in burner 20 and evolve into the reaction furnace 22 where the endothermic reactions of the Claus process occur and thermodynamic equilibrium is closely approached with residence times typically in the range of 0.3 to 2 seconds. Specifically in the burner flame, hydrogen sulfide and oxygen combine to produce sulfur dioxide and water and sulfuric acid is endothermically decomposed to steam, sulfur dioxide and oxygen. The injected oxygen and the oxygen formed from the sulfuric acid decomposition are completely consumed in a rapid irreversible reaction so that after the oxygen is reacted to extinction, hydrogen sulfide and sulfur dioxide are in the proper ratio according to the following formulas:

$$H_2S + 3/2\, O_2 \rightarrow SO_2 + H_2O \quad \text{(II)}$$

$$2H_2S + SO_2 \rightleftharpoons 2H_2O + 3/2\, S_2 \quad \text{(III)}$$

Some hydrogen is also produced by hydrogen sulfide disassociation, as follows:

$$2H_2S \rightleftharpoons 2H_2 + S_2 \quad \text{(IV)}$$

The reactor furnace effluent then passes through a circuitous eat exchange zone or waste heat boiler 24 wherein the combustion effluents are cooled against boiler feed water in line 26, which then produces steam in line 28. In the waste heat boiler 24, the reaction effluents are converted from one form of sulfur species to another ranging from $S_3$ to $S_8$. The major sulfur species are formed according to the following equations:

$$S_2 \rightleftharpoons 1/3\ S_6 \quad \text{(V)}$$

$$S_2 \rightleftharpoons 1/4\ S_8 \quad \text{(VI)}$$

The cooled effluent is removed from the waste heat boiler in line 30 still at high temperature and at a pressure only slightly below the pressure of the feeds to the burner. The effluent is then introduced into the first condenser 32 wherein the effluent is again heat exchanged to cool the effluent against boiler feed water in line 34 which produces steam in line 36. Liquid sulfur is condensed out, separated and drained in line 38 and the gaseous combustion effluent stream is removed in line 42. The liquid sulfur in line 38 is generally removed to a central sulfur pit which collects sulfur from many condensation units.

The effluent stream is then treated in a downstream Claus process train in which the stream in line 42 is then reheated in a reheater heat exchanger 48 typically against process steam. The reheated stream now in line 50 has been reheated to a temperature sufficient for further reaction of the hydrogen sulfide and sulfur dioxide contained therein, such temperature being approximately 430° F. This stream is then introduced into a catalytic converter reactor 52 wherein additional quantities of hydrogen sulfide and sulfur dioxide are reacted to produce sulfur (primarily $S_6$ and $S_8$) and water according to the following equations:

$$2H_2S + SO_2 \rightleftharpoons 3/6\ S_6 + 2H_2O \quad \text{(VII)}$$

$$2H_2S + SO_2 \rightleftharpoons 3/8\ S_8 + 2H_2O \quad \text{(VIII)}$$

The reacted stream now in line 54 is introduced into a second condenser 56 which again cools the effluent stream against boiler feed water in line 58 to produce additional steam in line 60. Additional elemental sulfur is recovered in line 62 in the liquid state wherein the sulfur species produced in the catalytic reaction are converted to high molecular weight sulfur species and are then condensed to elemental sulfur liquid.

The stream in line 64 is at a reduced temperature of approximately 338° F., which is below the desired temperature for additional catalytic reaction. Therefore, the stream is introduced into reheater heat exchanger 66 and heated against process steam to produce a feed stream in line 68 at a temperature sufficient for catalytic Claus reaction of approximately 420° F. This stream is introduced into a second catalytic converter 70 wherein a similar catalytic reaction between hydrogen sulfide and sulfur dioxide occurs with the catalytic effluent in line 72 going to yet another condenser 74, which is cooled with boiler feedwater 76 to produce steam in line 78. An additional quantity of liquid elemental sulfur is removed in line 80.

The effluent stream in line 82 is further reheated in reheater heat exchanger 84 to a temperature of 400° F. against process steam to produce a stream in line 86 at high temperature sufficient for a catalytic Claus reaction. This stream is introduced into the third and final catalytic reactor 88 to react substantially the remaining hydrogen sulfide and sulfur dioxide to produce sulfur species which are removed in line 90. That stream is introduced into a condenser 92 and cooled by boiler feedwater in line 94 producing steam in line 96. Further elemental sulfur in liquid form is removed in line 98 while the final effluent is recovered in line 100 comprising predominantly water vapor, nitrogen, carbon dioxide, hydrogen and residual hydrogen sulfide and sulfur compounds.

The stream in line 100 contains only 1.52 mole % of sulfur and is introduced into a tailgas coalescor 102 wherein additional sulfur mist is removed in line 104. When the plant is operated in accordance with the condition of case 3c of Table 1, and the feed of Table 2 the total hydrogen sulfide, sulfur dioxide and carbonyl sulfide emissions in the stream 106 is 6.88 lb. moles/hr. This is only slightly higher than the emissions for the case 1 air base case operation of 5.62 lb. mole/hr., in spite of the injection and recovery of 39.5 lb. moles/hr. of additional sulfur in the sulfuric acid injection of case 3c. For case 3a or 3b operation, with higher temperatures and higher conversion in the reaction furnace and reduced sulfur component flow to the catalytic converters, emissions should be less than the air based case 1. The residual stream in line 106 can be sent to a tailgas clean-up unit 109 through line 107 or alternately, sent directly to an incinerator 114 by opening of valve 113. If the stream in line 106 is directed into the tailgas clean-up unit 109, it can be further processed for the removal of sulfur and the resulting effluent in line 111 can be recycled to the front end of the system to the acid gas feed in line 10. The cleaned-up inert gas stream can then be cycled through line 115 into an incinerator for venting to the atmosphere. The incinerator 114 is operated with a burner 112 supplied with air 108 and a fuel, such as natural gas, in line 110 to combust any residual amounts of sulfur from the tailgas unit or alternately from the coalescor 102. The resulting stream in line 116 should be environmentally acceptable and can be vented to atmosphere.

The above embodiment is exemplary of the present invention which incorporates oxygen enrichment and sulfuric acid injection to provide; (1) an increased degree of freedom in oxygen enrichment levels, (2) an increase in the throughput for Claus plants, (3) a decrease in overall pressure drop through a Claus plant when the same capacity is utilized as prior to the injection of sulfuric acid, (4) a reduction in the effluent flow to and through the tailgas processing unit, (5) an equivalent or nearly equivalent percent recovery of sulfur from the feed gas stream, (6) a desirable inhibition of the oxidation of $H_2S$ in the reaction furnace by reaction (II) by the production of $SO_2$ from the $H_2SO_4$ that decomposes in the furnace, (7) a desirable source of additional oxygen for $H_2S$ combustion derived from the composition of the injected moderant $H_2SO_4$ and (8) the desirable enhancement of the endothermic reaction (III).

The present invention has been described with regard to one preferred embodiment, those skilled in the art will be capable of contemplating other variants which are deemed to be within the scope of the invention, which scope should be ascertained from the claims which follow.

I claim:

1. In a process for recovering sulfur from a feed gas stream having a substantial hydrogen sulfide content wherein the gas stream is partially combusted with an oxygen-enriched oxidant gas in a Claus reaction furnace zone, a combustion effluent is cooled with the attendant condensation separation of sulfur in a condensation zone and the remaining effluent stream is further treated, the improvement comprising introducing and decomposing to $H_2O$, $SO_2$ and oxygen a temperature moderating stream of sulfuric acid having a concentration of at least 50% in the reaction furnace zone to moderate the temperature of the oxygen enriched reaction furnace zone in the range of 2100° to 2800° F.

2. In a process for recovering sulfur from a feed gas stream having a substantial hydrogen sulfide content wherein the gas stream is partially combusted with an oxygen-enriched oxidant gas in a Claus reaction furnace zone, a combustion effluent is cooled with the attendant condensation and separation of sulfur in the first condensation zone and the remaining effluent stream is passed through at least one stage of: reheating, conversion in a catalytic Claus reaction zone and cooling with attendant condensation and separation of sulfur in an additional condensation zone, the improvement comprising introducing and decomposing to $H_2O$, $SO_2$ and oxygen a temperature moderating stream of sulfuric acid having a concentration of at least 50% in the reaction furnace zone to moderate the temperature of the oxygen-enriched reaction furnace zone in the range of 2100° to 2800° F.

3. The process of claim 1 wherein the oxygen-enriched oxidant gas has a total oxygen content of 32 to 100 mole%.

4. The process of claim 1 wherein the injected sulfuric acid constitutes approximately 1.0 lb. of acid per lb. of added 100% oxygen.

5. The process of claim 1 wherein the injected sulfuric acid is in the range of 0.15 to 2.0 lb. of acid per lb. of added 100% oxygen.

6. The process of claim 1 wherein the feed gas has a hydrogen sulfide content of at least 60 mole %.

7. The process of claim 1 wherein the feed gas has a hydrogen sulfide content of at least 90 mole %.

8. The process of claim 1 wherein the oxygen-enriched oxidant gas has a total oxygen content of 40 to 75 mole % oxygen.

9. The process of claim 1 wherein the sulfuric acid is a spent acid sludge from a sulfiric acid alkylation process.

10. The process of claim 1 wherein the sulfuric acid has a concentration in aqueous solution of at least 90 weight %.

11. The process of claim 1 wherein the sulfuric acid has a concentration of 100 Weight %.

* * * * *